(12) United States Patent
Bolt, Jr. et al.

(10) Patent No.: US 7,925,393 B2
(45) Date of Patent: Apr. 12, 2011

(54) METHOD AND APPARATUS FOR GENERATING A FOUR-DIMENSIONAL (4D) FLIGHT PLAN

(75) Inventors: Monte L. Bolt, Jr., Dunkirk, MD (US); Steven D. Corfman, Severna Park, MD (US)

(73) Assignee: Arinc Incorporated, Annapolis, MD (US)

( * ) Notice: Subject to any disclaimer, the term of this patent is extended or adjusted under 35 U.S.C. 154(b) by 737 days.

(21) Appl. No.: 11/832,267

(22) Filed: Aug. 1, 2007

(65) Prior Publication Data

US 2009/0037091 A1 Feb. 5, 2009

(51) Int. Cl.
*G05D 1/10* (2006.01)
*G01C 21/20* (2006.01)
*G08G 5/00* (2006.01)
(52) U.S. Cl. ...... 701/10; 701/205; 340/947; 340/995.12
(58) Field of Classification Search ............ 701/10, 701/205; 340/995.12, 947
See application file for complete search history.

(56) References Cited

U.S. PATENT DOCUMENTS

| 4,642,775 | A | * | 2/1987 | Cline et al. | 701/200 |
|---|---|---|---|---|---|
| 5,051,910 | A | * | 9/1991 | Liden | 701/204 |
| 6,134,500 | A | * | 10/2000 | Tang et al. | 701/202 |
| 6,393,358 | B1 | * | 5/2002 | Erzberger et al. | 701/120 |
| 6,879,886 | B2 | * | 4/2005 | Wilkins et al. | 701/3 |
| 7,010,398 | B2 | * | 3/2006 | Wilkins et al. | 701/3 |
| 7,650,232 | B1 | * | 1/2010 | Paielli | 701/205 |
| 2003/0093219 | A1 | * | 5/2003 | Schultz et al. | 701/202 |
| 2007/0129857 | A1 | * | 6/2007 | Fortier | 701/16 |
| 2009/0109065 | A1 | * | 4/2009 | Pinheiro | 340/971 |

* cited by examiner

*Primary Examiner* — Mark Hellner
*Assistant Examiner* — Ari M. Diacou
(74) *Attorney, Agent, or Firm* — Ronald E. Prass, Jr.; Prass LLP

(57) ABSTRACT

A method and apparatus that generates a 4D flight plan that takes in account weather, metrological data, and safety of flight information for 360 degree horizontal layer at all relevant altitudes and times is disclosed. The method may include receiving a flight plan request from a user, the flight plan including user preferences, receiving meteorological information and safety-of-flight information based on the user's origin, destination and preferences, generating a 4D flight plan based on the meteorological information, safety-of-flight information, and user preferences, and outputting the 4D flight plan for the user.

12 Claims, 3 Drawing Sheets

METHOD AND APPARATUS FOR GENERATING A FOUR-DIMENSIONAL (4D) FLIGHT PLAN

BACKGROUND OF THE DISCLOSURE

1. Field of the Disclosure

The disclosure relates to aircraft flight planning.

2. Introduction

A flight planning system is defined as a tool that will provide information about a specific flight to a pilot and other responsible or relevant parties. The primary output of any flight plan is the route-of-flight (using Highways in the Sky, for example), the time it will take to make the flight, and the fuel required to make the trip. The flight plan may include the actual amount of fuel to be consumed, plus the taxi fuel and any extra or reserve fuel.

Conventional flight planning systems typically generate thousands of output variables and each pilot, user, airline, etc. can typically choose which variables they want to see in the output. This process results in what is termed a customized flight plan.

Conventional flight planning systems have been restricted to using winds and temperatures aloft for computing times and fuel consumed. In this manner, conventional flight planning systems will look at various altitudes and determine based on winds and temperatures aloft, which route is the optimal to fly compared to any airway or waypoint flight restrictions. However, these systems do not have the ability to ingest or utilize any other real world environmental or tactical information. Moreover, since the wind and temperature data is forecast at different intervals throughout the day by several weather forecasters, inaccuracy and inconsistency may be prevalent.

SUMMARY OF THE DISCLOSURE

A method and apparatus that generates a 4D flight plan that takes in account weather, metrological data, and safety of flight information for 360 degree horizontal layer at all relevant altitudes and times is disclosed. The method may include receiving a flight plan request from a user, the flight plan including user preferences, receiving meteorological information and safety-of-flight information based on the user's origin, destination and preferences, generating a 4D flight plan based on the meteorological information, safety-of-flight information, and user preferences, and outputting the 4D flight plan for the user.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE DISCLOSURE

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosure comprises a variety of embodiments, such as a method and apparatus and other embodiments that relate to the basic concepts of the disclosure.

This disclosure concerns the introduction of other variables into a four-dimensional (4D) flight plan generator that may provide more real-world information for route-of-flight decision-making. In this manner, a flight plan may be run through any type of vector or latitude/longitude-based images that can be rendered in a way that the 4D flight plan generator can utilize the information. The flight plan may be considered 4D because it takes in account weather, metrological data, and safety of flight information for 360 degree horizontal layer at all relevant altitudes and times. This information may include forecasted data, real time/real world information or any combination thereof. Thus, any image may be provided in such a way that the 4D flight plan generator can make smart decisions based on a user and or aircraft configuration so that the aircraft can fly through, above, below, or around the particular area of interest so as to best meet the particular mission's goals.

The configuration may be by a portion of all available metrological and safety-of-flight products or by individual products. Some products may be configured using tolerances and/or user preferences. For example, a user's preference may dictate that it is fine to fly through bad weather as long as the aircraft does not fly through a certain area. A user may also specify to only generate a flight plan that has certain weather conditions. Another scenario may involve a flight plan being produced with a warning that advises the user that the flight plan was generated but was computed on the border of in some of the user's tolerance level settings.

Figure 1:
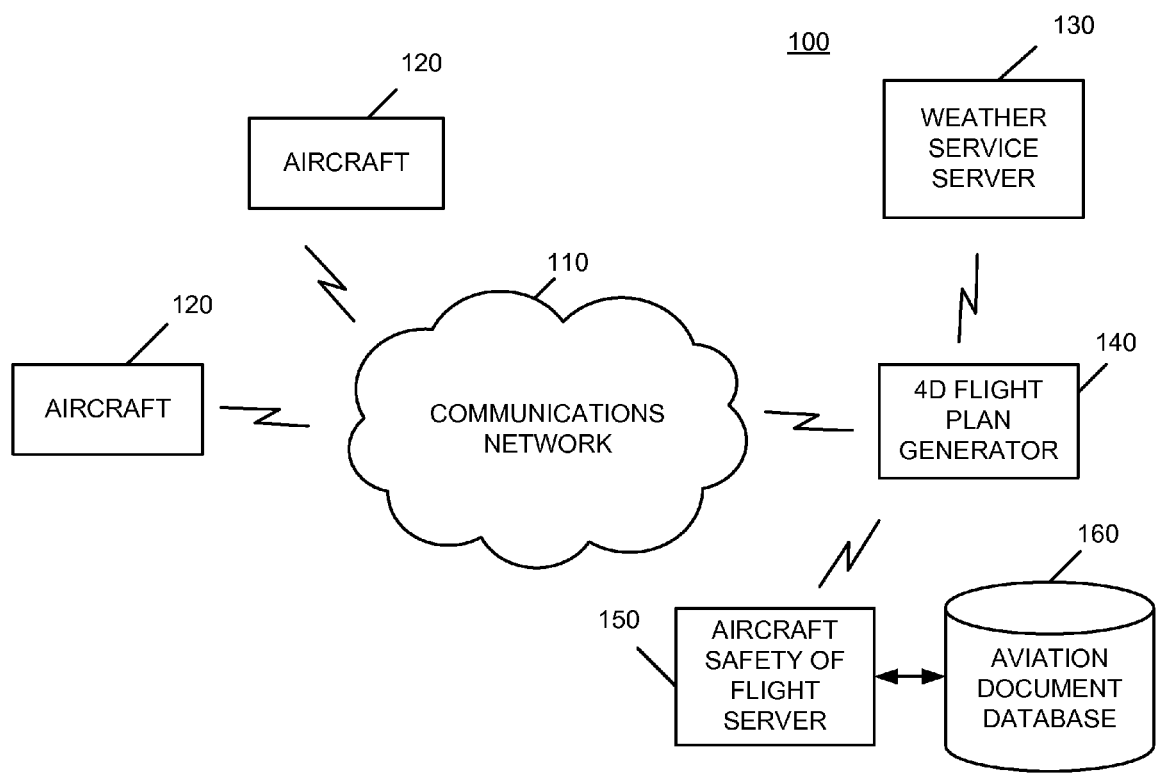
FIG. 1 illustrates an exemplary diagram of a 4D flight planning system in accordance with a possible embodiment of the disclosure.

FIG. 1 illustrates an exemplary diagram of a 4D flight planning system 100 in accordance with a possible embodiment of the disclosure. 4D flight planning system 100 may include communications network 110, a plurality of aircraft 120, weather service server 130, 4D flight plan generator 140, aircraft safety-of-flight server 150, and aviation document database 160. Communications network 110 may represent any communications network used by aircraft to communicate with other entities, including the Internet, an intranet, a VHF radio network, a SATCOM network, etc.

Weather service server 130 may represent any server that provides weather service information and meteorological data and products, including winds and temperatures aloft, wind shear, thunderstorms, turbulence, etc. Aircraft safety-of-flight server 150 may represent any server that may provide aviation-related documents, data and products related to safety-of-flight issues, such as NOTAMS, radio frequency information, enroute charts, approach plates, FAA notices, restricted airspace information, etc. Aviation document database 160 may be coupled to the aircraft safety flight server 150 and may store a plurality of aviation-related documents, data and products.

Figure 2:
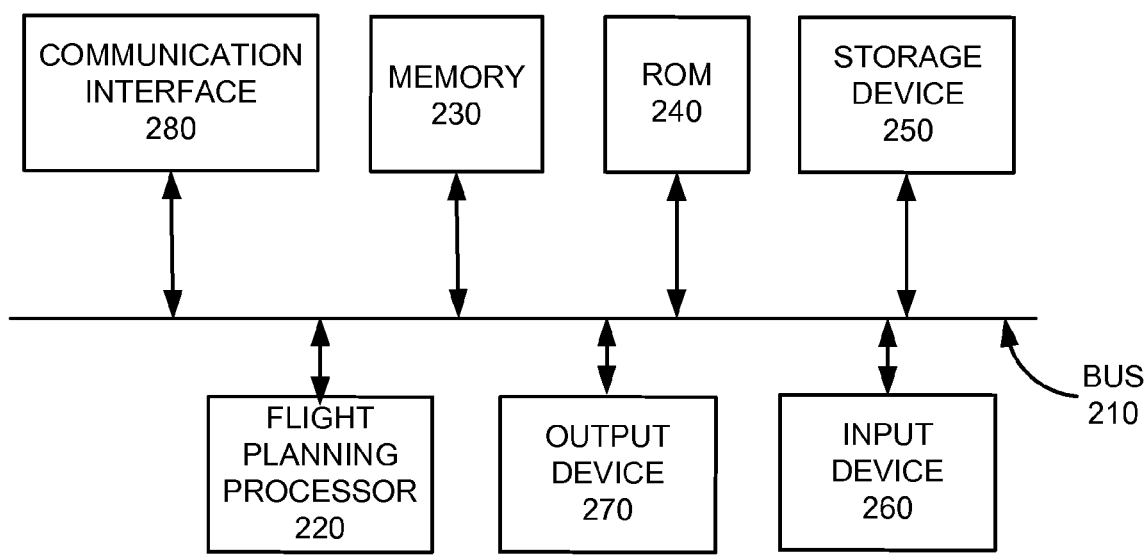
FIG. 2 illustrates a block diagram of an exemplary 4D flight plan generator in accordance with a possible embodiment of the disclosure.

FIG. 2 illustrates a block diagram of an exemplary 4D flight plan generator 140 in accordance with a possible embodiment of the disclosure. As shown, the exemplary 4D flight plan generator 140 may include a bus 210, a flight planning processor 220, a memory 230, a read only memory (ROM) 240, a storage device 250, an input device 260, an output device 270, and a communication interface 280. Bus 210 may permit communication among the components of the 4D flight plan generator 140.

Flight planning processor 220 may include at least one conventional processor or microprocessor that interprets and executes instructions. Memory 230 may be a random access memory (RAM) or another type of dynamic storage device that stores information and instructions for execution by flight planning processor 220. Memory 230 may also store temporary variables or other intermediate information used during execution of instructions by flight planning processor 220. ROM 240 may include a conventional ROM device or another type of static storage device that stores static information and instructions for flight planning processor 220. Storage device 250 may include any type of media, such as, for example, magnetic or optical recording media and its corresponding drive.

Input device 260 may include one or more conventional mechanisms that permit a user to input information to the 4D flight plan generator 140, such as a keyboard, a mouse, a pen, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables the 4D flight plan generator 140 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of the 4D flight plan generator 140, communication interface 280 may not be included in the exemplary 4D flight plan generator 140 when the 4D flight plan generation process is implemented completely within the 4D flight planning system 100.

The 4D flight plan generator 140 may perform such functions in response to flight planning processor 220 by executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

The 4D flight plan generator 140 illustrated in FIGS. 1-2 and the related discussion are intended to provide a brief, general description of a suitable computing environment in which the disclosure may be implemented. Although not required, the disclosure will be described, at least in part, in the general context of computer-executable instructions, such as program modules, being executed by the 4D flight plan generator 140, such as a general purpose computer. Generally, program modules include routine programs, objects, components, data structures, etc. that perform particular tasks or implement particular abstract data types. Moreover, those skilled in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like.

Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

For illustrative purposes, the 4D flight plan generation process will be described below in relation to the block diagrams shown in FIGS. 1-2.

Figure 3:
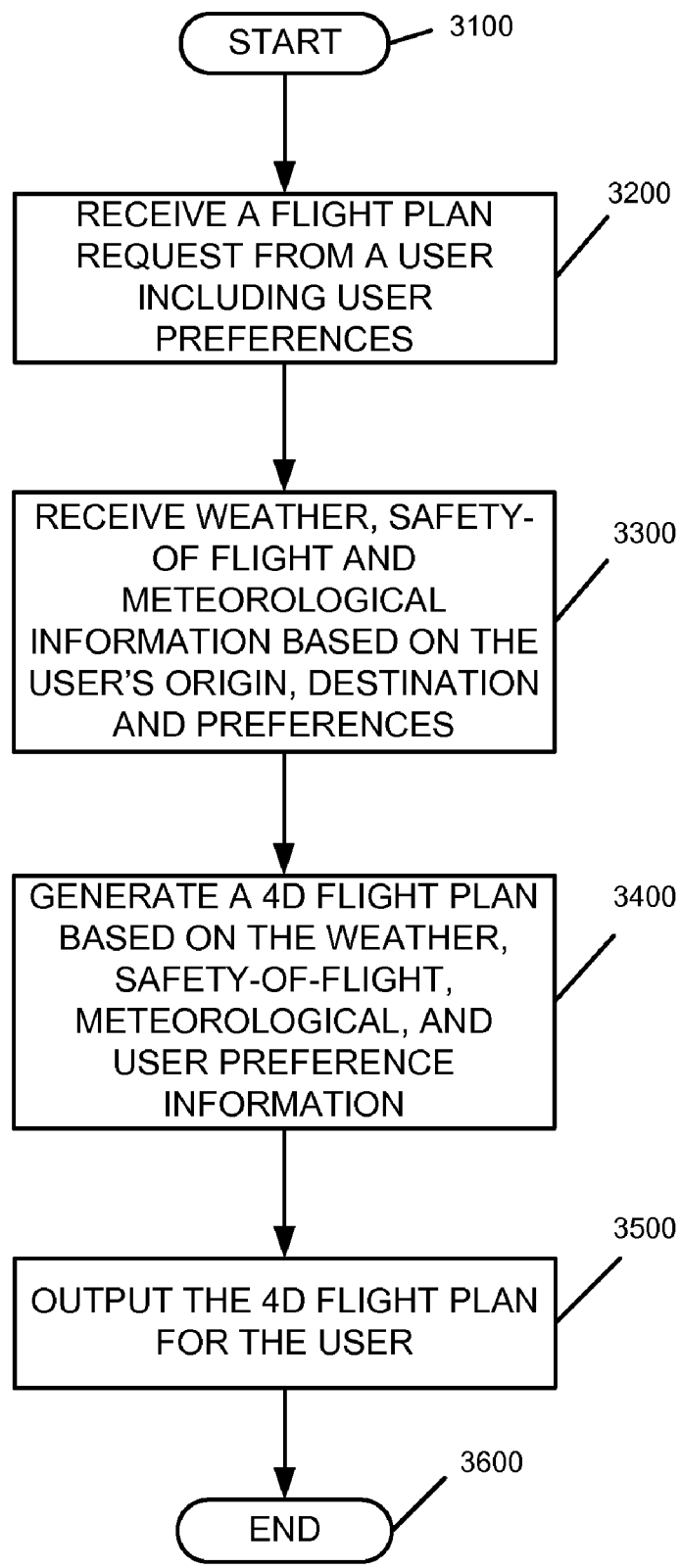
FIG. 3 illustrates an exemplary block diagram of a processing device for implementing the 4D flight planning process in accordance with a possible embodiment of the disclosure.

FIG. 3 is an exemplary flowchart illustrating some of the basic steps associated with a possible 4D flight plan generation process in accordance with a possible embodiment of the disclosure. The process begins at step 3100 and continues to step 3200 where the flight planning processor 220 of the 4D flight plan generator 140 may receive a flight plan request from a user. The flight plan may include user preferences and tolerance settings, such as to avoid turbulence, fly over a particular point of interest, avoid certain altitudes, fly at maximum range, fly at maximum fuel economy, fly to achieve fastest time, etc., for example.

At step 3300, the flight planning processor 220 may receive weather and other meteorological information from one or more weather service servers 130, and safety-of-flight information from one or more aircraft safety of flight servers 150 based on the user's origin, destination and preferences. Such metrological and safety-of-flight data that may be received and considered by the flight planning processor 220 may be aircraft performance data, winds aloft, navigation data, restricted areas, 4D radar, lightning reports, clear air turbulence reports, 4D NOTAMs, 4D SIGMETs, 4D AIRMETs, and wind shear reports.

At step 3400, the flight planning processor 220 may generate a 4D flight plan based on the weather/meteorological information, safety-of-flight information, user preferences, etc., for example. At step 3500, the flight planning processor 220 outputs the 4D flight plan. The flight plan may be output to a user in the aircraft 120 through communication network 110, another system, or to any other responsible individual, for example.

Note that the flight planning processor 220 may receive updated metrological and safety-of-flight information and send an updated flight plan to the user, even while the user's aircraft is in flight. This process may consider the aircraft's current geographical position. This information may include real time weather information, as well as forecasted information. In this manner, the aircraft may have its course or altitude modified from the original flight plan to take in account metrological and/or safety-of-flight information that has changed or materialized after the aircraft has been airborne for any matter of minutes, hours, or while still on the ground. The process then goes to step 3600 and ends.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the disclosure are part of the scope of this disclosure. For example, the principles of the disclosure may be applied to each individual user where each user may individually deploy such a system. This enables each user to utilize the benefits of the disclosure even if any one of the large number of possible applications do not need the functionality described herein. In other words, there may be multiple instances of the 4D flight plan generator 140 in FIGS. 1-2 each processing the content in various possible ways. It does not necessarily need to be one system used by all end users. Accordingly, the appended claims and their legal equivalents should only define the disclosure, rather than any specific examples given.

We claim:

1. A ground-based method for generating a four-dimensional (4D) flight plan that takes in account weather, metrological data, and safety of flight information for 360 degree horizontal layer at all relevant altitudes and times, comprising:
  receiving a flight plan request from a user, the flight plan including user preferences;
  receiving meteorological information and safety-of-flight information based on the user's origin, destination and preferences;
  generating a 4D flight plan based on the meteorological information, safety-of-flight information, and user preferences;
  outputting the 4D flight plan for the user;
  receiving updated metrological and safety-of-flight information;
  determining the user's aircraft position while in-flight;
  updating the user's 4D flight plan while the user's aircraft is in-flight based on the updated metrological and safety-of-flight information, and the user's aircraft position; and
  outputting the updated 4D flight plan to the user's aircraft in-flight.

2. The method of claim 1, wherein user preferences are at least one of avoid turbulence, fly over a particular point of interest, avoid certain altitudes, fly at maximum range, fly at maximum fuel economy, and fly to achieve fastest time.

3. The method of claim 1, wherein the metrological information includes at least one of winds aloft, 4D radar, lightning reports, clear air turbulence reports, 4D SIGMETs, 4D AIRMETs, and wind shear reports.

4. The method of claim 1, wherein the safety-of-flight information includes at least one-of aviation-related documents, aircraft performance data, navigation data, restricted areas, and 4D NOTAMs.

5. A computer-readable medium storing instructions for generating a four-dimensional (4D) flight plan from the ground that takes in account weather, metrological data, and safety of flight information for 360 degree horizontal layer at all relevant altitudes and times, the instructions comprising:
  receiving a flight plan request from a user, the flight plan including user preferences;
  receiving meteorological information and safety-of-flight information based on the user's origin, destination and preferences;
  generating a 4D flight plan based on the meteorological information, safety-of-flight information, and user preferences;
  outputting the 4D flight plan for the user;
  receiving updated metrological and safety-of-flight information;
  determining the user's aircraft position while in-flight;
  updating the user's 4D flight plan while the user's aircraft is in-flight based on the updated metrological and safety-of-flight information, and the user's aircraft position; and
  outputting the updated 4D flight plan to the user's aircraft in-flight.

6. The computer-readable medium of claim 5, wherein user preferences are at least one of avoid turbulence, fly over a particular point of interest, avoid certain altitudes, fly at maximum range, fly at maximum fuel economy, and fly to achieve fastest time.

7. The computer-readable medium of claim 5, wherein the metrological information includes at least one of winds aloft, 4D radar, lightning reports, clear air turbulence reports, 4D SIGMETs, 4D AIRMETs, and wind shear reports.

8. The computer-readable medium of claim 5, wherein the safety-of-flight information includes at least one of aviation-related documents, aircraft performance data, navigation data, restricted areas, and 4D NOTAMs.

9. A ground-based four-dimensional (4D) flight plan generator that takes in account weather, metrological data, and safety of flight information for 360 degree horizontal layer at all relevant altitudes and times, comprising:
  a communication interface; and
  a flight planning processor that receives a flight plan request from a user through the communication interface, the flight plan including user preferences, receives meteorological information and safety-of-flight information based on the user's origin, destination and preferences, generates a 4D flight plan based on the meteorological information, safety-of-flight information, and user preferences, outputs the 4D flight plan for the user, receives updated metrological and safety-of-flight information, determines the user's aircraft position while in-flight, updates the user's 4D flight plan while the user's aircraft is in-flight based on the updated metrological and safety-of-flight information, and the user's aircraft position; and outputs the updated 4D flight plan to the user's aircraft in-flight.

10. The 4D flight plan generator of claim 9, wherein user preferences are at least one of avoid turbulence, fly over a particular point of interest, avoid certain altitudes, fly at maximum range, fly at maximum fuel economy, and fly to achieve fastest time.

11. The 4D flight plan generator of claim 9, wherein the metrological information includes at least one of winds aloft, 4D radar, lightning reports, clear air turbulence reports, 4D SIGMETs, 4D AIRMETs, and wind shear reports.

12. The 4D flight plan generator of claim 9, wherein the safety-of-flight information includes at least one of aviation-related documents, aircraft performance data, navigation data, restricted areas, and 4D NOTAMs.

* * * * *